United States Patent [19]

Kenichi

[11] 4,423,621

[45] Jan. 3, 1984

[54] KNOCKING DETECTOR

[75] Inventor: Yoshida Kenichi, Yokosuka, Japan

[73] Assignee: Nissan Motor Company, Limited, Yokohama, Japan

[21] Appl. No.: 195,628

[22] Filed: Oct. 9, 1980

[30] Foreign Application Priority Data

Oct. 11, 1979 [JP] Japan ................. 54-131224
Nov. 16, 1979 [JP] Japan ................. 54-148456
Mar. 26, 1980 [JP] Japan ................. 55-38721

[51] Int. Cl.$^3$ .............................................. G01L 23/22
[52] U.S. Cl. ........................................ 73/35; 123/425
[58] Field of Search ............................ 73/35; 123/425

[56] References Cited

U.S. PATENT DOCUMENTS 4,002,155 1/1977 Harned et al. ................. 123/425
4,106,447 8/1978 West ............................ 123/425
4,111,035 9/1978 West et al. .................... 73/35
4,153,020 5/1979 King et al. .................... 123/425
4,240,388 12/1980 Omori et al. ................. 123/425

FOREIGN PATENT DOCUMENTS 27153252 4/1977 Fed. Rep. of Germany
2030644 4/1980 United Kingdom .

Primary Examiner—James J. Gill
Attorney, Agent, or Firm—Schwartz, Jeffery, Schwaab, Mack, Blumenthal & Koch

[57] ABSTRACT

A rectifier rectifies the output of a sensor which senses vibrations of an engine. The output from the rectifier is supplied through a smoothing circuit to a comparator where the smoothed rectified output from the smoothing circuit and the output of the sensor are compared to obtain a signal representing knocking when the knocking occurs. This signal is used to cut off supply of the rectified signal from the rectifier to the smoothing circuit during knocking.

12 Claims, 11 Drawing Figures

KNOCKING DETECTOR

BACKGROUND OF THE INVENTION

1. Field of the Invention

The present invention relates to a knocking detector for an internal combustion engine.

2. Description of the Prior Art

When strong knocking continues in an internal combustion engine, the engine is adversely affected in durability. It is known, however, that slight knocking at relatively low engine speeds brings about best engine output and fuel economy. There is a close relationship between the occurrence of knocking and the ignition timing; the further the ignition timing is advanced, the more knocking occurs.

Conventionally, a system has been proposed wherein the knocking state of the engine is sensed to adjust the ignition timing to maintain a slight knocking state, thereby improving fuel economy and engine output.

It is known that when knocking occurs, the engine vibrates, thereby resulting in an increase of the amplitude of the vibration component with a particular frequency. The above conventional system utilizes this fact; it includes a sensor which senses the vibration of the engine body, selects a band of particular frequency vibration components, removes a component corresponding to the background noise level to determine the knocking intensity from the remaining portion, and retards the spark timing when knocking stronger than a predetermined level occurs to limit the knocking to an appropriate magnitude.

Actually, it is very difficult to determine the level of the background noise. For example, where the output signal of a vibration sensor is rectified and thus smoothed to obtain a signal corresponding to the background noise level, this signal contains knocking components and so does not reflect exactly the background noise level. Thus, when knocking occurs, the knocking strength is likely to appear to be lower than its actual value.

SUMMARY OF THE INVENTION

The knocking detector according to the present invention includes means for rectifying the output of sensing means which senses vibrations of an engine. The knocking detector further includes means for smoothing the output of the rectifying means, means for comparing the output of the smoothing means with the output of the sensing means, and means responsive to the output of the comparing means for cutting off supply of the rectified signal from the rectifying means to the smoothing means during knocking occurrence.

The cut off means may include a sample and hold circuit disposed between the rectifying means and the smoothing means, means for differentiating the output of the comparing means with respect to time, and a monostable multivibrator responsive to the output of the differentiating means for supplying a pulse output having a predetermined duration to the sample and hold circuit during knocking in order to cause the sample and hold circuit to retain the value of the output of the rectifying means directly before the knocking.

The amplifying means may be of variable amplification gain type and of offset voltage adding type which adds a predetermined direct current voltage to the amplification of the output from the sample and hold circuit.

The cut off means may include an analog switch in place of the sample and hold circuit. In this case, the cut off means further includes means for transforming a group of successive narrower pulses produced relatively close to each other to a wider pulse to control the opening and closing of the analog switch.

The transforming means may include a smoothing circuit for smoothing the output of the comparing means, and a comparator for comparing a predetermined reference voltage and the output of the smoothing circuit.

BRIEF DESCRIPTION OF THE DRAWINGS

Other objects, features and advantages of the present invention will be more clearly appreciated from the following description taken in conjunction with the accompanying drawings in which like reference numerals designate corresponding elements, and in which.

DETAILED DESCRIPTION OF THE PREFERRED EMBODIMENTS

Figure 1:
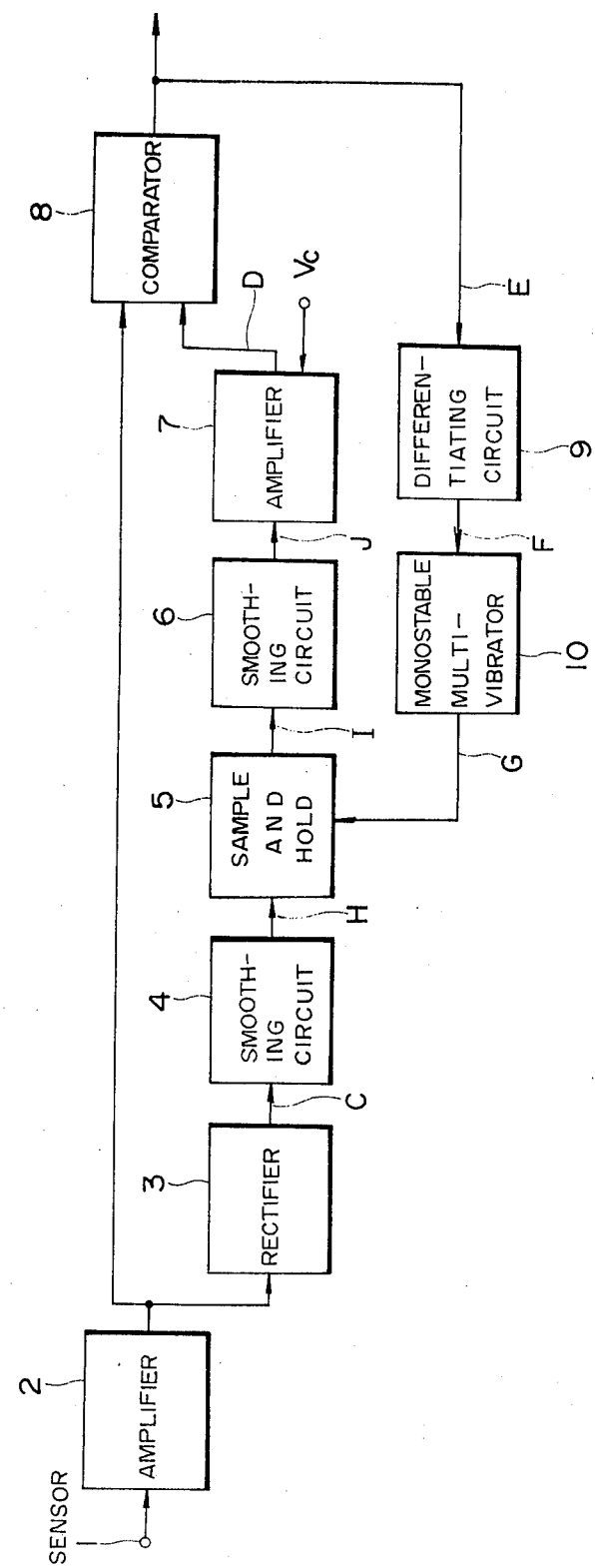
FIG. 1 is a block diagram of a preferred embodiment of a knocking detector according to the present invention.

First, assume that the rotational speed of the engine is constant, and an offset voltage Vc for an amplifier 7 is set to zero, which offset voltage will be described in more detail afterward. Referring to FIG. 1 of the drawings, there is shown a preferred embodiment of the knocking detector according to the present invention. A sensor 1 converts an engine vibration to an electrical vibration.

More particularly, as the sensor, a resonant sensor may be used which mechanically resonates to engine knocking, or alternatively a non-resonant sensor may be used which includes a band-pass filter provided at the output of the sensor. An amplifier 2 amplifies a range of knocking frequencies from the sensor 1 or selected by a band-pass filter provided at the output of a non-resonant sensor.

Figure 2:
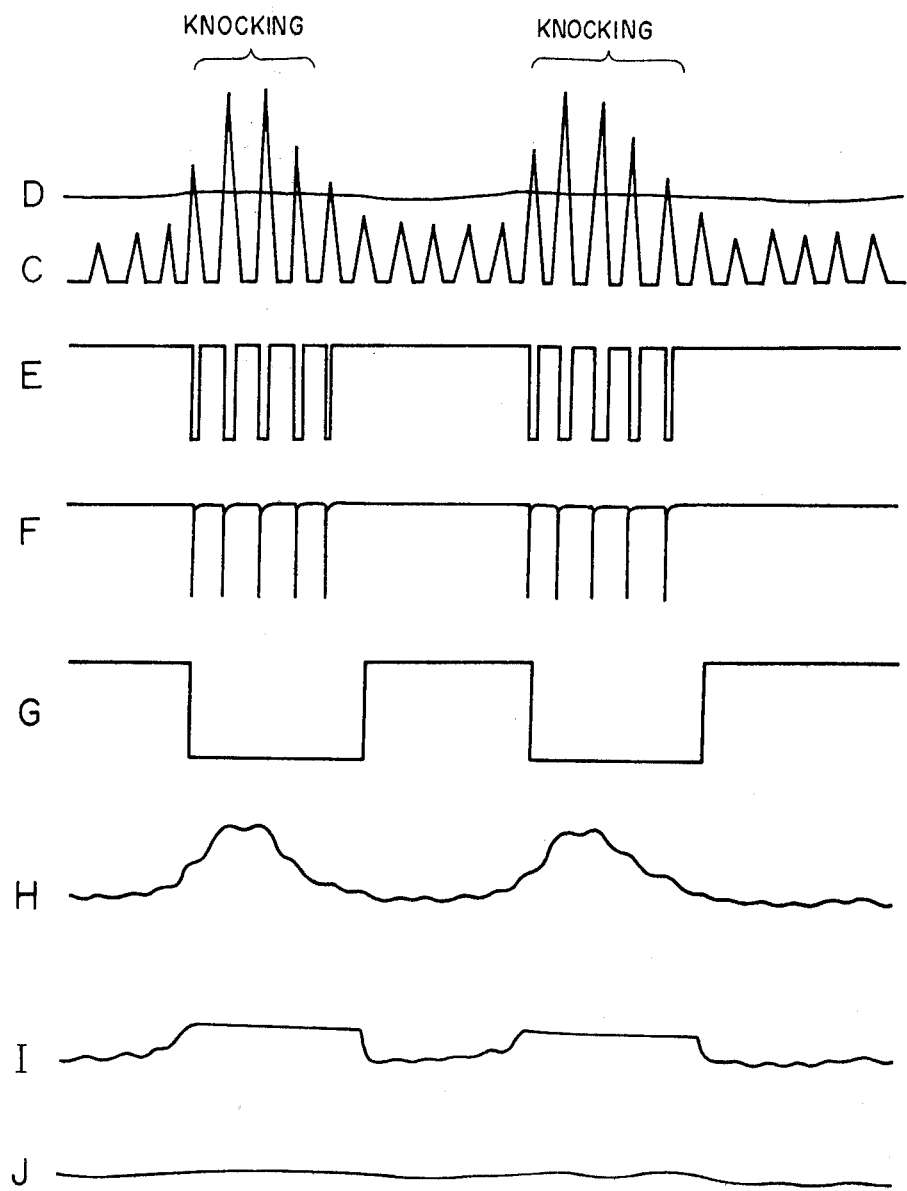
FIG. 2 is a timing chart for the knocking detector.

The signal from the amplifier 2 is rectified in half-wave or full-wave mode by a rectifier 3 into a signal whose amplitude is larger when knocking occurs than when there is no knocking, as shown by C in FIG. 2. The rectified signal is smoothed by a smoothing circuit 4, which may include a first-order lag circuit of a resistor and capacitor. A sample and hold circuit 5 samples and holds the output of the smoothing circuit. The output of the circuit 5 is further smoothed by a second smoothing circuit 6 which may be similar in construction to the smothing circuit 4, thereby carrying out stabler knocking detection. The smoothing circuit 6 output is amplified by a second amplifier 7 whose output represents the background noise level, as shown by D in FIG. 2.

The background noise level signal and the amplifier 2 output whose positive-going waveform portion is the same as that shown by C in FIG. 2 are compared by a comparator 8 which outputs a train of negative-going pulses, as shown by E in FIG. 2. As knocking becomes stronger, the sensor output can be higher than the background noise level shown by D in FIG. 2. Thus the number of pulses of the pulse train signal and the duration of each of the pulses increase. The integrated value of the pulse train signal, shown by E in FIG. 2 changes according to the strength of knocking, which can thus be detected accurately. The negative-going pulse train signal is differentiated by a differentiating circuit 9 to form a pulse signal as shown by F in FIG. 2. This pulse signal is transformed by a monostable multivibrator 10 into a signal having wider negative pulses shown by G in FIG. 2 the duration of each of which corresponds to the time interval when knocking occurs. To this end, the monostable multivibrator 10 may be of a retriggerable type which is set to a metastable state each time a triggering signal is given thereto to produce a pulse wider than each triggering pulse.

A sample and hold circuit 5 sends the signal as it stands, shown by H in FIG. 2, from the first smoothing circuit 4 to the second smoothing circuit 6, when the monostable multivibrator 10 output is high, whereas the circuit 5 holds the value of the signal from the smoothing circuit 4 directly before knocking occurs and sends it to the second smoothing circuit 6 when the monostable multivibrator 10 output goes low. The output of the sample and hold circuit 5 is shown by I in FIG. 2.

The time constant of the smoothing circuit 4 is selected to be sufficiently small that the smoothed voltage occurring in the absence of knocking can be regarded as not containing the smoothing of larger amplitude portions of the rectified signal.

Since the smoothing circuit 4 output to the second smoothing circuit 6 is held from the moment the comparator 8 has produced a low level output after the occurrence of knocking, the larger amplitude portions of the signal from the smoothing circuit 4 due to the occurrence of knocking are prevented from being sent to the second smoothing circuit 6. As a result, the background noise level signal D obtained by amplifying the signal from the second smoothing circuit 6, using the amplifier 7, is no longer affected by the occurrence of knocking, and coresponds exactly to the background noise level. Accordingly, the pulse train signal E from the comparator 8 obtained by comparing the background noise level D and the amplifier 2 output exactly represents the strength of knocking. On the other hand, when there is no knocking, the comparator 8 produces a high level output which is sent through the differentiating circuit 9 to the monostable multivibrator 10 during which time the multivibrator 10 does not prevent the signal from the first smoothing circuit 4 being sent through the sample and hold circuit 5 to the second smoothing circuit 6.

There are vibrations produced due to causes other than knocking, such as the operation of intake and exhaust valves and the rotation of the crankshaft. These vibrations contain appreciable components equal to the knocking frequencies and increase in amplitude as the engine speed and vibration increase. As the engine speed increases, the amplitude of knocking vibration increases.

Generally, a vibration sensor tends to produce an output whose amplitude increase rate decreases as the amplitude of the input vibration increases. This trend is particularly conspicuous in a resonant type vibration sensor. As a result, the rectifier 3 produces an output as shown by waveform L4 in FIG. 3 in the lower speed area of the engine, whereas in the higher speed area it produces an output in which the difference between the amplitude of the knocking portions and the amplitude of the remaining portions is smaller, as shown by waveform K3 in FIG. 4.

Figure 3:
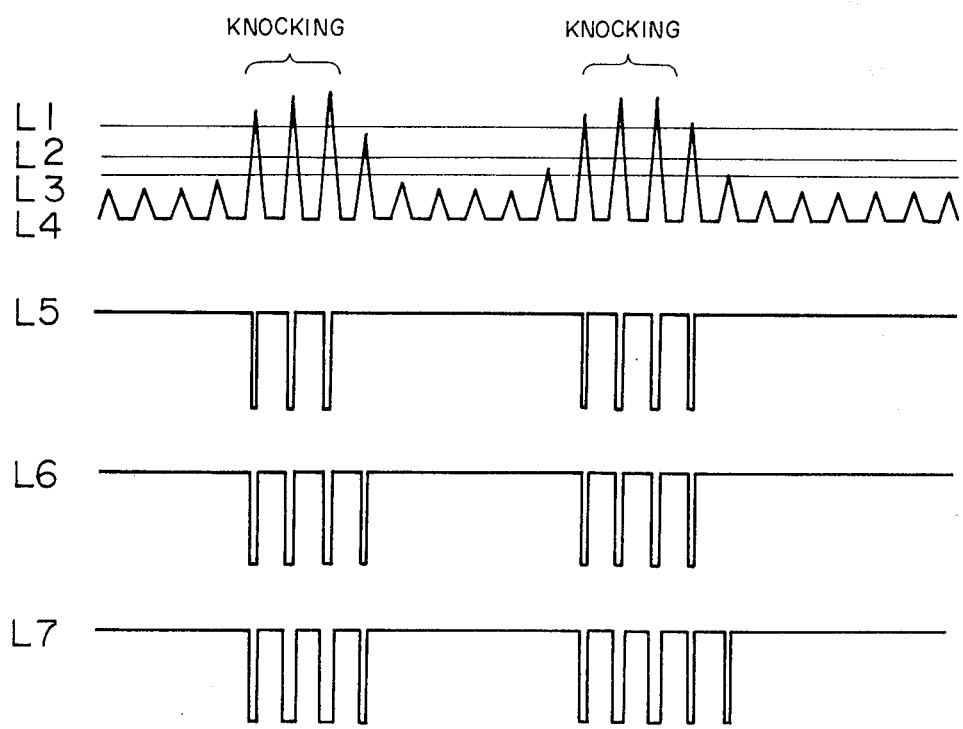
FIG. 3 is a timing chart for the knocking detector when the engine speed is low.

The background noise level signal from the amplifier 7 is generally set to a value twice the amplitude of the rectified signal (FIG. 3: L4, FIG. 4: K3) when no knocking occurs, and is not altered by the knocking. Thus, in the higher engine speed range the background noise level signal is as shown by K1 in FIG. 4, while in the lower engine speed range, it is as shown by L2 in FIG. 3. In the range of higher engine speeds, the pulse train signal representing the knocking strength from the comparator 8 is as shown by K4 in FIG. 4, while in the range of lower engine speeds, it is shown by L6 in FIG. 3. That is, the number of pulses in the signal from the comparator 8 and the duration of each pulse decrease in the range of higher engine speeds compared with the range of lower engine speeds. As a result, the same strength of knocking is liable to be assessed as lower as the engine speed increases.

Figure 5:
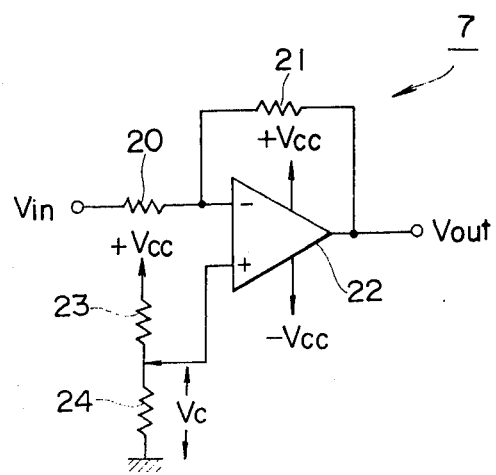
FIG. 5 is a circuit diagram of an amplifier used in the knocking detector.

In order to avoid this problem, a predetermined direct current, or offset, voltage Vc is added to a signal obtained by amplifying the smoothing circuit 6 output in the amplifier 7. This signal, thus obtained, is supplied to the comparator 8 as a background noise level signal. The amplifier 7 may have a structure shown in FIG. 5 which includes two resistors 20, 21 and an operational amplifier 22 and in which the offset voltage Vc is determined by the ratio of resistors 23 and 24.

Figure 4:
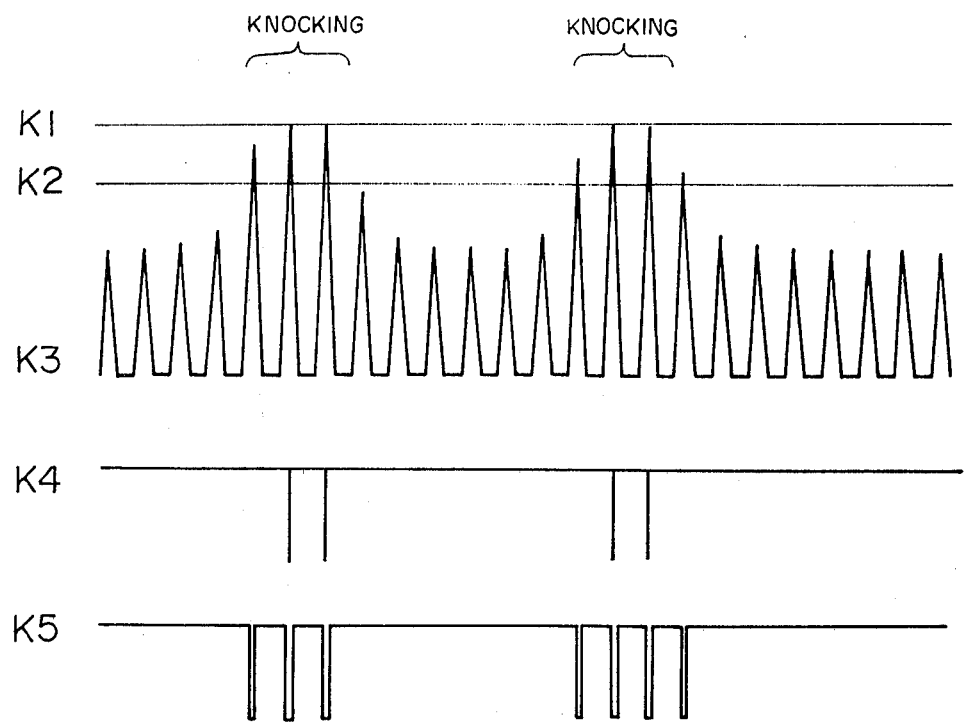
FIG. 4 is a timing chart for the knocking detector when the engine speed is high.

The offset voltage Vc is set as follows. In FIGS. 3 and 4, when the engine is at high speed, the offset voltage Vc is temporarily adjusted to zero so that the comparator 8 output is as shown by K5 in FIG. 4, thereby determining the gain of the amplifier 20. In this case, the background noise level signal is as shown by K2 in FIG. 4.

Under the same conditions of knocking, when the engine rotates at lower speed, the comparator 8 output is shown by L7 in FIG. 3 and the background noise level signal is shown by L3 in FIG. 3.

Next, the offset voltage Vc is increased from zero so as to change the background noise level signal to L1 shown in FIG. 3. This causes the comparator output L5 shown in FIG. 3 to equal the comparator output shown by K5 in FIG. 4 when the engine is at higher speed, with respect to signal pattern i.e. the number of pulses contained in the comparator output and the duration of each pulse.

Under these conditions, if the engine returns to a higher speed, the background noise level signal will increase by the offset voltage with respect to the level K2 shown in FIG. 4. Therefore the amplifier gain is decreased to compensate for the increase in the background noise level signal. Then, the offset voltage Vc is again adjusted when the engine speed is in the lower range. Repetition of such processes results in having particular gain and offset voltage of the amplifier 7 such that the output signal of the comparator 8 has substantially the same signal pattern (i.e. the same duration and number of pulses in the higher and lower engine speed ranges when the actual knocking strength is the same in the higher and lower engine speed ranges).

Accordingly, in this case, knocking of the same strength will be determined as having the same strength irrespective of the engine rotational speed, on the basis of the knocking strength signal obtained by integrating output pulses of the comparator 8 with respect to time.

Figure 6:
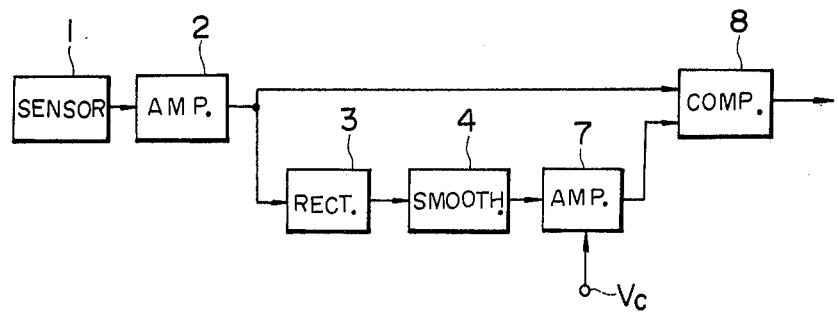
FIG. 6 is a block diagram of a second embodiment of the present invention.

FIG. 6 shows a second embodiment of the present invention which is obtained by removing the elements 5, 6, 9 and 10 from the first embodiment of FIG. 1 and connecting the output of the smoothing circuit 4 directly to the input of the amplifier 7. The basic operation and effect of this second embodiment is substantially the same as those of the embodiment of FIG. 1.

Figure 7:
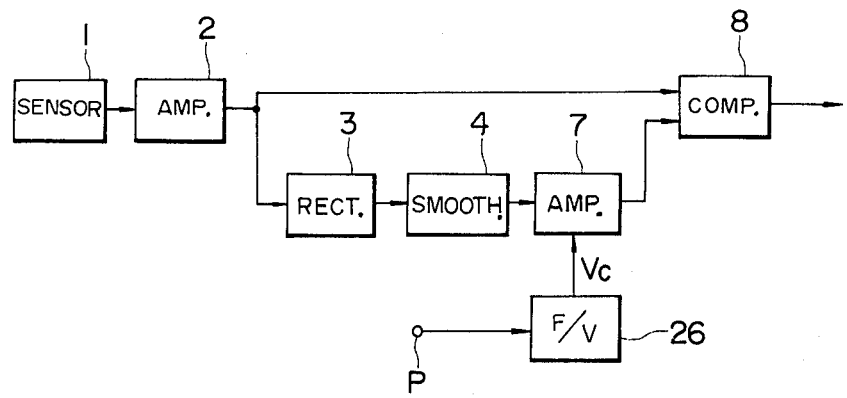
FIG. 7 is a block diagram of a third embodiment of the present invention.

A third embodiment, shown in FIG. 7 is the same as the embodiment of FIG. 6 except that a signal synchronized with the engine rotation such as a contact breaker signal P is converted by a frequency to voltage (F/V) converter 26 into a voltage proportional to the rotational speed of the engine which is used as an offset voltage Vc for the amplifier 7. This embodiment provides more reliably an appropriate background noise level signal over the whole range of rotational speeds so that the knocking strength is determined more reliably.

Figure 8:
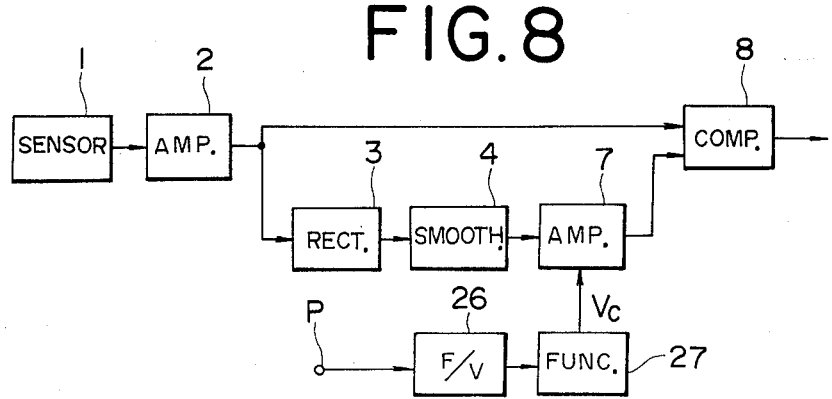
FIG. 8 is a block diagram of a our embodiment of the present invention.

A fourth modification, shown in FIG. 8 has the same structure as the third embodiment of FIG. 7 except that the output signal of the F/V converter 26 is converted by a function generator 27 into a voltage signal changing according to, but not necessarily proportional to, the engine speed, and this signal is used as an offset voltage Vc for the amplifiers 7. When the background noise level varies in a non-linear relationship to the engine speed, the knocking strength is thus correctly determined.

Figure 9:
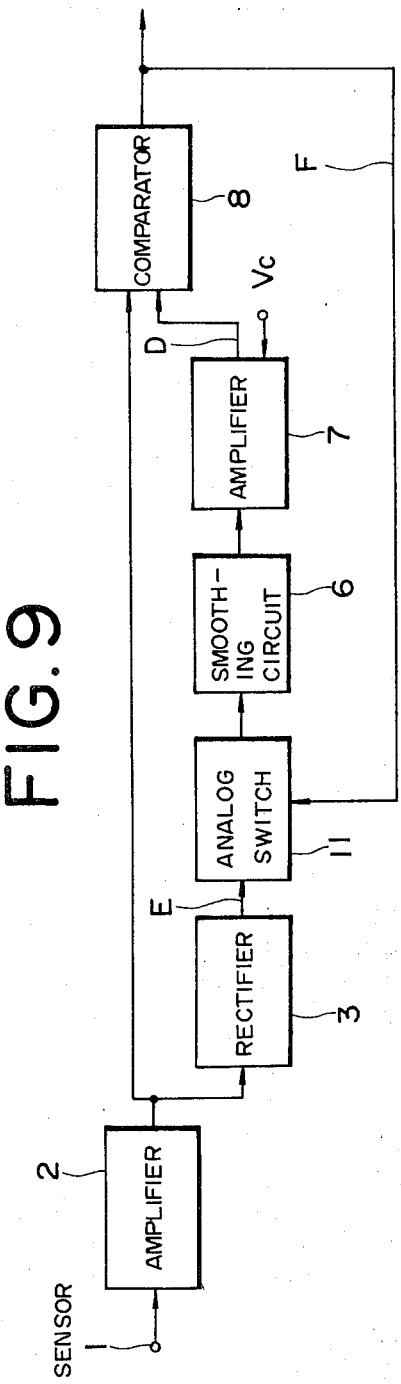
FIG. 9 is a block diagram of a fifth embodiment of the present invention.

A fifth embodiment of FIG. 9 is the same as the first embodiment of FIG. 1 except that an analog switch 11 is used to connect the output of the rectifier 3 to the smoothing circuit 6 in place of the first smoothing circuit 4 and the sample and hold circuit 5. The output of the comparator 8 is directly used to open and close the analog switch 11, and the smoothing circuit 6 is a charge-and-discharge circuit or an integrating circuit having a relatively large time constant.

Figure 10:
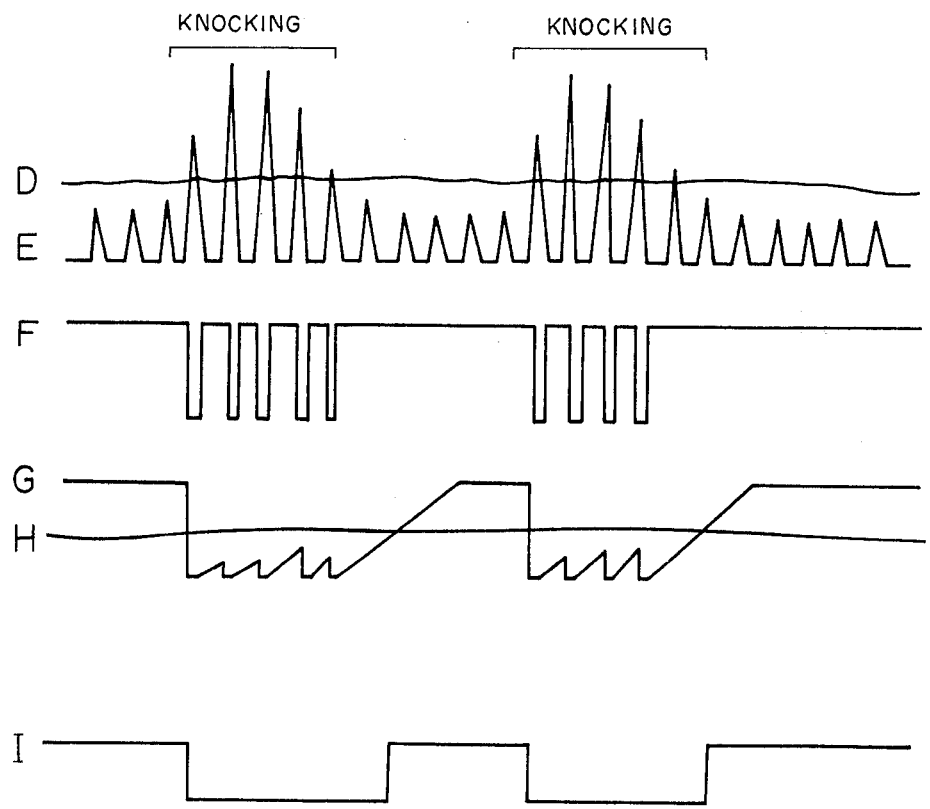
FIG. 10 is a timing chart for the fifth and a sixth embodiment of the present invention.

In operation, when no knocking occurs the comparator 8 produces higher level output portions of the signal shown by F in FIG. 10 which close the analog switch 11 so that the output E (in FIG. 10) of the rectifier 3, representing the background noise level, is supplied to the smoothing circuit 6.

On the other hand, when knocking occurs the comparator 8 produces lower level portions of the signal F which immediately opens the analog switch 11 so that the output of the rectifier 3, which now has an increased amplitude, to the smoothing circuit 6 is cut off.

The smoothing circuit 6 is basically a charge-and-discharge circuit or an integrating circuit having a relatively large time constant so that when the rectified signal is cut off, the smoothing circuit 6 and therefore the amplifier 7 substantially retains throughout the knocking the signal value immediately before the cut off of the rectified signal. As a result, the pulse signal shown by F in FIG. 10 from the comparator 8 exactly indicates the knocking strength.

Figure 11:
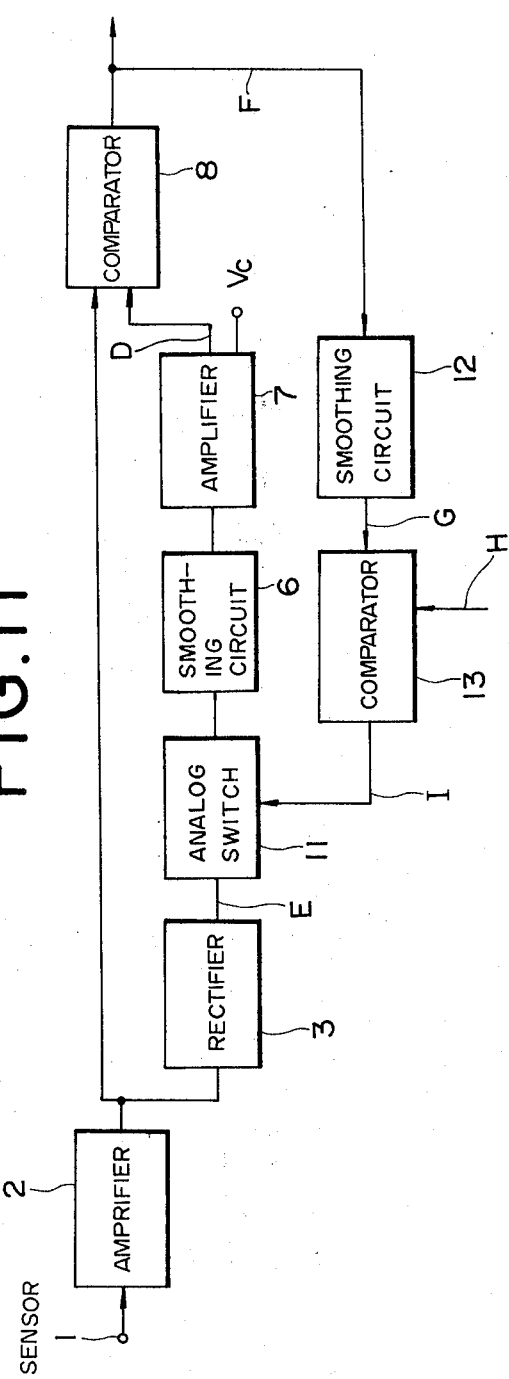
FIG. 11 is a block diagram of the sixth embodiment of the present invention.

A sixth embodiment of this invention shown in FIG. 11 has the same structure as the embodiment of FIG. 9 except that the circuit leading from the comparator 8 to the analog switch 6 includes a smoothing circuit 12 which smoothes the output of the comparator 8, and a second comparator 13 which compares the output of the smoothing circuit 12 with a reference value.

In operation, the pulse signal (F in FIG. 10) from the comparator 8 is integrated with respect to time by the smoothing circuit 12 as shown by G in FIG. 10, when the signal is high. This integrated value is reset when the signal from the comparator 8 becomes low. The output G of the smoothing circuit 12 is low during knocking while it is high when there is no knocking. The output of the smoothing circuit 12 is compared with the reference voltage H in FIG. 10 in the comparator 13. When the output signal from the smoothing circuit 12 is lower than the reference voltage, that is, knocking is occurring, the comparator 13 outputs a low level portion of the signal I in FIG. 10 which opens the analog switch 6, thereby cutting off the rectified signal now having an increased amplitude from the rectifier 3. In other words, when knocking occurs successively, a group of pulses from the comparator 8 are converted into a pulse with a duration corresponding to the total duration of the group.

In the last two embodiments, the amplifier 7 may have an appropriate small offset voltage Vc which prevents the rectified signal from being excessively cut off, thereby resulting in incomplete operation of the present detector although for example the background noise level signal may be at a minimum voltage level during engine starting. Thus, if the detector of the present invention is used with an ignition timing control device, it is possible to control the ignition timing exactly according to knocking strength.

It is to be understood that the foregoing description concerns preferred and other embodiments of the present invention, which are not intended to be limitative thereof, but which are given by way of explanation. Thus it will be clear to those skilled in the art that various changes and modifications in the embodiments may be made without departing from the spirit and scope of the present invention.

What is claimed is:

1. A knocking detector for an engine, comprising:
    (a) means for sensing vibration of the engine as an alternating current signal;
    (b) means for rectifying the output of said sensing means;
    (c) means for smoothing the output of said rectifying means;
    (d) means for comparing the output of said smoothing means with the output of said sensing means; and
    (e) means responsive to the output of said comparing means for cutting off supply of the rectified signal to said smoothing means during knocking.

2. The knocking detector of claim 1, wherein said cut off means includes a sample and hold circuit disposed between said rectifying means and said smoothing means, means for differentiating the output of said comparing means with respect to time, and a monostable multivibrator responsive to output of said differentiating means for supplying a pulse output having a predetermined duration to said sample and hold circuit during knocking in order to cause said sample and hold circuit to retain the value of the output of said rectifying means directly before the knocking occurrence.

3. The knocking detector of claim 1 or 2, further including means disposed between said smoothing means and said comparing means for amplifying the output of said smoothing means inputted to said comparing means, said amplifying means being an offset voltage type amplifier operable to add a predetermined direct current voltage to the amplification of the output from said sample and hold circuit.

4. The knocking detector of claim 3, further including second smoothing means disposed between said rectifying means and said sample and hold means.

5. The knocking detector of claim 3, wherein the direct current voltage is constant.

6. The knocking detector of claim 3 wherein the direct current voltage is changed according to a predetermined function depending on the engine speed.

7. The knocking detector of claim 3, wherein the direct current voltage is proportional to the engine speed.

8. The knocking detector of claim 1, wherein said cut off means includes an analog switch.

9. The knocking detector of claim 8, wherein said cut off means further includes means for transforming a group of successive narrower pulses produced relatively close to each other to a wider pulse to control the opening and closing of said analog switch.

10. The knocking detector of claim 9, wherein said transforming means includes a smoothing circuit for smoothing the output of said comparing means, and a comparator for comparing a predetermined reference voltage and the output of said smoothing circuit.

11. The knocking detector of claim 8, 9 or 10, further including means disposed between said smoothing means and said comparing means for amplifying the output of said smoothing means inputted to said comparing means, said amplifying means being an offset voltage adding type amplifier operable to add a predetermined direct current voltage to the amplification of the output of said smoothing means.

12. The knocking detector of claim 11, wherein said smoothing circuit includes an integrating circuit with a relatively large time constant.

* * * * *

UNITED STATES PATENT AND TRADEMARK OFFICE
CERTIFICATE OF CORRECTION

PATENT NO. : 4,423,621

DATED : January 3, 1984

INVENTOR(S) : Kenichi YOSHIDA

It is certified that error appears in the above-identified patent and that said Letters Patent is hereby corrected as shown below:

On the cover sheet of the patent, under Item [75], the inventor's name should read: -- Kenichi Yoshida --

Signed and Sealed this

Eighth Day of October 1985

[SEAL]

Attest:

Attesting Officer

DONALD J. QUIGG

Commissioner of Patents and Trademarks—Designate